United States Patent [19]

Bohrn et al.

[11] Patent Number: 4,775,586

[45] Date of Patent: Oct. 4, 1988

[54] PAPER, PAPER PRODUCTS, FILMS COMPOSITES AND OTHER SILICATE-POLYMER, CONSTRUCTION MATERIALS

[75] Inventors: Walter J. Bohrn, Lancaster; Richard A. Brubaker, Willow Street; Shelly N. Garman, Lancaster; Lewis K. Hosfeld, Mountville; Thomas M. Tymon, Lancaster, all of Pa.

[73] Assignee: Armstrong World Industries, Inc., Lancaster, Pa.

[21] Appl. No.: 15,262

[22] Filed: Feb. 17, 1987

[51] Int. Cl.$^4$ ............... B32B 19/00; B32B 19/06; B28D 1/32; D21D 3/00

[52] U.S. Cl. ................... 428/324; 428/454; 106/DIG. 3; 252/378 R; 264/110; 162/181.6; 524/449

[58] Field of Search ............ 428/324, 363, 537.5, 428/454; 264/110; 162/181.6, 181.8; 524/449; 106/291, DIG. 3; 252/378 R

[56] References Cited

U.S. PATENT DOCUMENTS

| | | | |
|---|---|---|---|
| 2,125,286 | 8/1938 | Fletcher | 52/483 |
| 2,481,391 | 9/1949 | Campbell | 106/84 |
| 2,614,055 | 10/1952 | Senarclens | 241/4 |
| 2,795,545 | 6/1957 | Gluesenkamp | 252/28 |
| 3,001,571 | 9/1961 | Hatch | 428/292 |
| 3,122,468 | 2/1964 | Cadotle | 162/181.8 X |
| 3,356,611 | 12/1967 | Walker et al. | 252/28 |
| 3,390,045 | 6/1968 | Miller, Jr. et al. | 162/3 |
| 3,434,917 | 3/1969 | Kraus et al. | 162/3 |
| 3,540,892 | 11/1970 | Lard et al. | 106/18.11 |
| 3,654,073 | 4/1972 | Lard et al. | 162/145 |
| 3,764,456 | 10/1973 | Woodbams | 523/209 |
| 3,779,860 | 12/1973 | Oshida et al. | 162/129 |
| 3,970,627 | 7/1976 | Seymus | 523/205 |
| 4,060,451 | 11/1977 | Uchiyama | 162/157.3 |
| 4,123,401 | 10/1978 | Berghmans et al. | 523/210 |
| 4,239,519 | 12/1980 | Beall et al. | 264/212 X |
| 4,247,364 | 1/1981 | Culp | 428/324 X |
| 4,269,657 | 5/1981 | Gomez et al. | 162/135 |
| 4,271,228 | 6/1981 | Foster et al. | 428/281 |
| 4,273,825 | 6/1981 | Nishiyama et al. | 428/324 X |
| 4,297,139 | 10/1981 | Beall et al. | 501/2 |
| 4,305,992 | 12/1981 | Langer et al. | 428/324 |
| 4,366,203 | 12/1982 | Briggs | 428/304.4 |
| 4,421,815 | 12/1983 | Briggs et al. | 428/198 |
| 4,425,465 | 1/1984 | Padget et al. | 524/450 |
| 4,447,491 | 5/1984 | Bradbury et al. | 428/304.4 |
| 4,480,060 | 10/1984 | Hoda et al. | 523/446 |
| 4,485,203 | 11/1984 | Hutchinson | 524/414 |
| 4,559,264 | 12/1985 | Hoda et al. | 428/324 |
| 4,675,235 | 6/1987 | Wu | 428/363 |
| 4,707,298 | 11/1987 | Tymon | 252/378 R |

FOREIGN PATENT DOCUMENTS

| | | |
|---|---|---|
| 2475567 | 8/1981 | France . |
| 615541 | 1/1949 | United Kingdom . |
| 1119305 | 7/1968 | United Kingdom . |

OTHER PUBLICATIONS

"X-Ray and Infrared Data on Hectorite-Guanidines and Montmorillonite-Guanidines", C. Beck and G. Brunton, Eighth National Conference on Clays and Clay Minerals, pp. 22–38.

P. Lepoutre et al., "Dry Sintering of Latex Particles in Pigmented Coatings. I. Influence on Coating Structure and Properties," J. Appl. Polym. Sci., 26, 791-797, 801-808.

M. M. Mortland et al., "Triethylene Diamine—Clay Complexes as Matrices for Adsorption and Catalytic Reactions," Clays and Clay Minerals, vol. 24, 60-63, 1976.

*Primary Examiner*—John E. Kittle
*Assistant Examiner*—Susan S. Rucker

[57] ABSTRACT

Two:One layered silicate flocs with homogeneously intermixed polymers and a method for the composition's preparation is described. Preferred embodiment include co-flocculated homogeneously intermixed polymer and 2:1 layered silicate. The materials are prepared by contacting a co-dispersion of polymer and silicate with a cationic flocculant.

55 Claims, No Drawings

PAPER, PAPER PRODUCTS, FILMS COMPOSITES AND OTHER SILICATE-POLYMER, CONSTRUCTION MATERIALS

BACKGROUND OF THE INVENTION

1. Field of the Invention

The present invention relates to silicate-polymer products; the use of 2:1 layered silicates in combination with polymers to prepare paper, sheet materials, composites, films, paper products, printed wiring boards, fibers and other types of construction products. Silicates are popular materials for such items due to their qualities of fire and heat resistance.

2. The Prior Art

Many references describe the use of silicates both alone and in combination with other ingredients such as asbestos, fiber-glass, resins, and the like. One reference is U.S. Pat. No. 3,654,073 which describes the preparation of non-burning paper. This reference teaches the use of flocculating agents to prepare the paper. In accordance with the process of this reference, however, these flocculants are placed into an aqueous acidified solution to which successive portions of asbestos fibers, latex, which is immediately flocculated onto the fiber, followed by fiberglass, and finally the vermiculite platelets are added. According to the reference, the vermiculite platelets (added last) are caused to "coalesce and precipitate on the asbestos and fiberglass".

Another reference which describes the use of micas to prepare a variety of paper products is U.S. Pat. No. 4,239,519. This reference describes in detail making paper with mica synthetic minerals beginning with the aqueous dispersion of the mica to obtain a gel which can be flocculated for making paper materials. Paper-making processes are also described therein.

Materials and methods are, however, limited which successfully combine qualities of superior fire and heat resistance, with other qualities such as elongation, durability, water-resistance, toughness, flexibility, strength and dielectric properties. It would further be advantageous to provide new or improved methods of preparation of such materials which provides such superior qualities. Accordingly, it is an object of the instant invention to describe silicate materials having superior heat and fire resistance, superior strength, durability, and elongation. Materials are also described herein, which have the characteristics desired for papers, paper products, composites, films and construction materials. A further object of the instant invention is to describe a process for the preparation of preferred silicate materials having superior strength and other desirable characteristics.

SUMMARY OF THE INVENTION

It has been found that desired qualities and/or characteristics can be obtained from flocculated 2:1 layered silicate containing polymers.

Compositions of the instant invention can be prepared by a process which provides materials of flocculated 2:1 layered silicates containing polymers in a homogenous intermixture. Said compositions have remarkably superior qualities. The material produced can be used to prepare films, paper, paper products, composites, boards, shaped articles, fibers and other materials. Flexibility, strength, water resistance, toughness and elongation are especially improved.

The process for preparing this water resistant construction material flocculated 2:1 layered silicate containing polymer comprises: (1) Preparing a homogeneous dispersion with (a) a 2:1 layered silicate material having an average charge per structural unit of from-0.4 to about-1.0, (b) a polymer and (c) a polar liquid, and (2) contacting the dispersion with a cationic flocculant thereby destabilizing the dispersion and forming a silicate floc which also contains the polymer, (The Floc Product.)

The materials of the instant invention can also include other ingredients selected to enhance, modify, or provide certain characteristics. These other ingredients can be added either to the product, or at any time during the process. Preferably, however, these other ingredients should be added during step (1). It has been found to be detrimental to strength to add such materials to the floc instead of the dispersion. These materials can include fibers, pulp, polymeric-fiber-pulp, polymer modifiers, thickeners, plasticizers, emulsifiers, and pigments. It is also possible, however, to blend these ingredients with the flocculated product when the end use of the product permits. One can also disperse more than one polymer with the silicate, choosing the combination of polymers desired to modify product characteristics.

The material resulting from the above-described process can also be used in any paper-making process, and/or with equipment useful for making paper or paper products. When using the compositions for paper making, it is preferred to use co-dispersions of step (1) having a % solids concentration of from about 0.5 to about 5% (by weight). Co-dispersions having higher % solids concentrations (5% by weight and up) are useful for making articles such as composites, boards, boxes, bricks, fibers, films, etc.

The dispersable 2:1 layered silicate material used in the above described process, can be obtained commercially or prepared according to procedures known and described in the art for the preparation of vermiculite or mica dispersions. It is also permissible to use one or more ion exchange reactions to disperse the selected 2:1 layered silicate in the same polar liquid in which the floc is formed.

Further embodiments of the instant invention includes (a) compositions having a polymer and flocculated silicate, homogeneously mixed, (b) co-flocculated silicate-polymer materials, and (c) articles that can be formed with either (a) or (b). Furthermore, by judicious choice of the polymers and the cationic flocculant, preferred characteristics and/or qualities can be obtained in the materials produced. Fibers and fiberous pulp can also be used to obtain or optimize desired characteristics.

Preferred compositions are included which comprise (1) flocculated 2:1 layered silicates having an average charge per structural unit of from about $-0.4$ to about $-1.0$, (2) polybenzimidazole fibers, and (3) a polymer latex which also can be flocculated, if desired. This combination of materials has been found to have desirable characteristics such as durability, heat resistance, fire resistance, water resistance, dielectric properties and strength.

DETAILED DESCRIPTION

The 2:1 layered silicates which can be used to prepare the instant compositions and used in Step (1) of the instant process includes both micas and vermiculites. Additionally, either natural or synthetic silicates can be used. Two:one layered silicates to which the process of the present invention may be applied can be found defined and described in: *Crystal Structures of Clay Materials and Their X-Ray Identification* by G. W. Brown, published by Mineralogical Society, 1980, especially pages 2-10.

The term "mica" is used herein to refer to layered silicates having a charge density approximately equal to $-1$; while vermiculites have a charge density in the range of about $-0.6$ to about $-0.9$. Examples of specific layered silicates which may be used in the invention are vermiculite, muscovite, hydrobiotites, phlogopite, biotite, fluorphlogopite, lepidolite and lepidomelane. Synthetic silicates such as synthetic mica and synthetic vermiculite can also be used with the processes and materials described herein. Synthetic micas, for example, can be selected from: hectorite, taeniolite and tetrasilicic mica. An appropriate mica can also be selected from the group of fluorhectorite, hydroxyl hectorite, boron fluorphlogopite, hydroxyl boron phlogopite, and solid solutions among those and between those and other structurallycompatable species selected from the group, talc, fluortalc, polylithionite, fluorpolylithionite, phlogopite, and fluorphlogopite. Both natural and synthetic micas and vermiculites can be used in the instant process and for the instant compositions.

The term "vermiculite" as used herein includes minerals consisting wholly or largely of vermiculite, or minerals of a mixed-layer type containing vermiculite layers as an important constituent, such as hydrobiotites and chlorite-vermiculites, but does not include minerals of the montmorillonite group.

The term "swelled layer silicate" or "swelled 2:1 layered silicate" refers to the 2:1 layered silicate materials which have interstitial cations that allow silicate dispersions to be prepared directly from these materials by combining them with a polar liquid and preferably, adding agitation. The polar liquid typically used is water so therefore, the materials are frequently referred to as water-dispersable or water swellable 2:1 layered silicates.

The materials which are treated with the cationic flocculants are herein described as "dispersions." The term "dispersion" is used herein to refer to the swelled unflocculated 2:1 layered silicates which result from: (1) the combination of the swelled layered silicates with the polar liquid or (2) the swelling and dispersing of 2:1 layered silicate material in situ with polar liquid containing the necessary exchange ions to cause swelling. The dispersion, depending on the amount of polar liquid combined with the 2:1 layered silicates ranges from the less viscous suspensions which are dispersions having lower solids contents (less than 5% by weight solids content in the dispersion). The term "dispersion" also includes the semi-solid gels which can be prepared by either removing liquid from the lower solids content dispersions or by adding a specifically desired amount of the polar solvent to the swellable 2:1 layered silicate materials in order to make the high solids dispersion or the semi-solid gel. The dispersion can be either mostly solids (less than 50% liquid) or mostly liquid (more than 50% liquid). Semi-solid gels are desired in order to facilitate handling and processing properties. This is the case especially when the materials are going to be molded, shaped, drawn into a film, and/or applied to or combined with woven, knitted, or non-woven fibers and fabric materials before flocculation.

The term "flocculate" refers to the aggregation or coagulation of fine particles present in a high or low solids content dispersion. Flocculation is thus distinguishable from the mere falling of particles, (sedimentation) and flocculated silicate is distinguished from a silicate dispersion. Silicate dispersions can be treated with cationic flocculants to form a silicate floc. The silicate floc can also be described as an aggregate, or coagulation of the silicate platelets that were swelled and/or partially or totally delaminated and then dispersed in a solution.

A cationic flocculant is an ion that exchanges with the interstitial ions in the silicate, and causes the dispersed silicate platelets to be "destabilized" and form a floc. The flocculant is thus characterized and distinguished from merely acting as an exchange cation in that the cationic flocculant causes separated and dispersed silicate platelets to be joined together and coagulate in a mass. Thus, the separated platelets in the dispersion are no longer stable when the cationic flocculant contacts the separated silicate platelets. Exchange takes place simultaneously with this destabilization of the silicate platlet's previous dispersed and separated state, and the platelets become locked closely together in a floc. Destabilization can be particularly noted in the lower solids content dispersions in which masses of the floc form which themselves can be collected by filtration or draining of the polar liquid.

The polymers referred to herein are materials which have a molecular weight of at least 50,000 or greater and typically have a large number of repeating monomeric units per molecule. The repeating units can be random or uniform. Copolymers are also included. This does not include the lower molecular weight oligomers. Oligomers typically have from three to fifteen repeating units and are very much lower in molecular weight. The typical molecular weight range of such materials is from about 2,000 to 10,000. Such materials, for example, include epoxies which can be cured or further polymerized or crosslinked so that the number of repeating units and molecular weight is increased. It has been found that such materials do not flocculate even with high concentrations of cationic flocculant, which do flocculate dispersed polymers. Furthermore, certain characteristics obtained with polymers, such as high glass transition temperatures, are either not obtained with the oligomers or can only be obtained through the use of curing agents or further polymerization.

The polymers used are in a liquid or powdered state and can include surfactants, wetting agents, and/or dispersing aids to help prepare the dispersion.

Contacting the codispersion of polymer and 2:1 layered silicate with an effective amount of the cationic flocculant will begin the ion exchange between the flocculant and the silicate which thereby destabilizes the dispersion by the flocculation of the silicate resulting in the formation of the floc product. Any cationic flocculant can be used to destablize the homogeneous co-dispersion of 2:1 layered silicate and the polymer thereby forming the floc. It has been found that the flocced product will also contain the polymer which was codispersed with the silicate even if the polymer is not itself flocculated. This is true whether the polymer is dispersable or nondispersable in the liquid used for the dispersion.

Included in the embodiment described herein are the flocculated silicate-polymer product, and the process for preparing it when:

(1) the polymer is not dispersable by itself in the liquid used for the dispersion, but can be dispersed in the dispersed silicate with or without dispersing aids such as wetting agents and surfactants. In such a process, the silicate is usually prepared first. While not wanting to be bound by theory, it is felt that in this case, when the silicate, is flocculated, the polymer must stay with the flocculating silicate, and even if the polymer itself does not interact with the cationic flocculant, a closely bound stronger product containing polymer is provided.

(2) the polymer is dispersable in the liquid used for the dispersion. In this case, flocculation of the silicate will still bring or keep (and probably trap) polymer within the silicate floc even if the polymer remains unflocculated. In this instance, the lower solids content dispersion (less than 5% solids) should have a minimum of about 3% by weight of the total solids by polymer solids.

(3) The polymer dispersed to form the "co-dispersion" can also, if desired, be flocculated along with the silicate. The simultaneous flocculation of both the polymer and the silicate is herein referred to as "coflocculation," and the product formed can be referred to as co-floc. It has been found that the cationic flocculants flocculate the dispersed 2:1 layered silicate at lower concentrations than required to flocculate the co-dispersed polymer. One could, therefore, intentionally flocculate only the silicate in order to obtain non-flocculated polymer in the product. Conversely, one can, if desired, use a higher concentration of the particular cationic flocculant which is effective to obtain the co-flocculation. The cationic flocculant is used in an effective amount. The point of co-flocculation can be determined by testing the selected polymer with a solution having a known concentration of the cationic flocculant. By visually noting flocculation of the polymer one can then use the cationic flocculant at a concentration effective for co-flocculation.

Testing can also be used to compare particular cationic flocculants. For example, cations derived from compounds having the guanidine moiety are in some cases weaker flocculants than flocculating cations consisting of the diammonium cations, and especially the preferred diammonium compounds described subsequently herein where $R^2$ is hydrogen. For co-flocculation, a minimum concentration of 0.1 molar can be recommended in general for the cationic flocculants; for the diamine flocculants, the concentration can be a minimum of 0.05.

In the first step of the instant process, the silicate and the desired polymer are mixed or combined to form a dispersion. The silicate used should, therefore, have an interstitial cation which promotes the swelling of the silicate platelets to form the dispersion. It desired, such a cation can be introduced by conducting an ion exchange reaction which introduces a water-swelling cation into the silicate in place of the non-swellable interstitial cation of the silicate layers. This material can be dried and dispersions prepared at a later desired time by contacting it with a polar liquid. When natural silicate is used, more than one exchange will sometimes be needed since potassium is often present, which is difficult to exchange to make the silicate water-swellable. The potassium can be exchanged with sodium, which is then exchanged with lithium. Occasionally, lithium does not promote swelling to the extent needed, and it also can be exchanged. This cation is then exchanged with a cation which will promote swelling of silicate to the extent necessary for the preparation of the silicate dispersion.

The silicate dispersion is prepared by swelling the silicate in the desired polar solution. Preferably, shear stress is used to separate the silicate layers. Alternatively, one can use the previously described ion exchange procedure to obtain the silicate dispersion and then add the polymer desired.

The silicate and polymer can be combined in any convenient order. After a homogeneously co-dispersed polymer and silicate combination is obtained, the dispersion is contacted with the cationic flocculant to destabilize the dispersion and form the polymer-silicate product. This is preferably accomplished by combining the dispersion and a polar solution of the flocculating agent by any convenient order or method; but most preferably, the dispersion is added to a polar solution containing the flocculating agent.

The polymer selected will allow certain characteristics to be obtained in the product. The polymer should be either liquid or powdered. A wide range of polymers are available for use. Both resins and latex polymers can be used.

The latex can permissively be either a dispersion or an emulsion. Preferred latex polymers can be selected from the group consisting of: carboxylated NBR (acrylonitrile butadiene), polyvinylidenechloride, polystyrene, styrene butadiene latices, polyvinyl chloride, carboxylated butadiene styrene latices, fluorinated ethylene propylene latices, acrylic latices, and polytetrafluoroethylene latices. The resin used can be thermoplastic or thermoset. An acceptable thermoplastic resin can be selected from: fluorinated polymers, polyamides, polyamid-imides, silicones, polyether-imide, polyarylsulfone, polyethersulfone, polyetherimide, polyphenylineoxide, polycarbonates, polyacrylate, polyphenylene sulfide, polyetherketone, polybutylene terephthalate, polyethylene terephthalate, polyethylene, and polypropylene. Acceptably, a thermoset resin can be selected from the group consisting of: polyimides, polyesters, melamine formaldehyde, phenolic, and polyacrylate.

Fluorcarbon polymers are among the more preferred because of their distinct characteristics. These polymers are available in aqueous dispersions and as resins. Some of these preferred polymers can be selected from the commercially available preparations which includes (1) the negatively charged hydrophobic colloids containing fluorcarbon resin particles stabilized with anionic wetting agents and (2) negatively charged hydrophobic colloids containing fluorcarbon resin particles stabilized with non-ionic wetting agents and (3) water-based dispersions of hexafluorpropylene (tetrafluoroethylene copolymer) stabilized with a mixture of volatile and non-ionic anionic wetting agents.

Desired polymers can also be selected which are fusable by heat. In a preferred embodiment, a heat fusable polymer can be combined with 2:1 layered silicates in a dispersion. A film can be drawn from the dispersion or an article formed before flocculation. The cationic flocculant can then be contacted with the film or article for ion exchange and flocculation to destabilize the dispersion thereby either trapping the polymer or co-flocculating it with the silicate. After that, the material is preferably washed and dried and the heat fusable polymer can then be fused by subjecting the article to heat.

Relative concentrations of the polymer and the silicate used will, to a great extent, depend on the final product use and other factors such as the polymer selected, and even the particular type of apparatus to be used in processing the flocced product. When paper is to be prepared, typically a low solids dispersion is used for step 1 of the instant process. For the preparation of paper, the solids content is thus usually less than 5% by weight solids. For such low solids content dispersions, if the polymer is water dispersable and remains unflocculated, it is preferred to prepare the dispersion so that the total amount of polymer and silicate solids has a minimum amount of 3% by weight polymer, although when a co-flocculation is desired, solids can be as low as 1% by weight polymer.

For a high solids content dispersion (a minimum of 5% by weight solids content), the solids can be as low as 1% by weight polymer for an acceptable product.

When the product is to be used to prepare paper, an acceptable polymer:silicate weight ratio range for the instant process is from about 0.02:.98 (2% polymer) to about 0.4:.6. A preferred amount of polymer is from 3–50% by weight of the total solids. The silicate is preferrably from about 97 to 40% by weight of the total solids. Preferrably fiber is also used.

If, however, a film, composite, or article is to be prepared, a much wider concentration range is found. For such materials, and for the co-flocculating process, the polymer can vary from 1 to 90%, and the silicate from 99 to 1%. The polymer is preferably from 5 to 80% and the silicate preferably from 20 to 95%. One may desire to intentionally prepare a flocced product having as low as 1% by weight polymer in order to obtain a slightly modified silicate. Characteristics, such as pliability, durability, and softness to the polymer silicate-floc can be introduced.

In other embodiments, fibers and/or a polymeric fiber pulp can be included. A preferred fiber is polybenzimidazole, which gives superior properties. Other acceptable fibers include cellulosic, metallic, and synthetic fibers. Fibers can be natural, metallic, or synthetic. Other suitable fibers are rayon, polyamide, nylon, polyphenylene sulfide, polyester, acrylic, phenolic, aramid, acetate polyimide, polyamide-imide, polyethylene and polypropylene. Other fibers that can be used are silicone, boron, carbon, ceramic and glass. By selecting a fiber having a particular desired characteristic, the resulting product characteristics can be controlled. The fiber selected will depend on final use.

When the floc is to be used for paper, it is preferred to add either a fibrous polymer or a polymeric fiber pulp material. With the instant process and compositions, such materials should be mixed in during step (1) before flocculation. The fibrous material (including pulp) can be in a concentration of from 1.5 to 75% of the total solids, and preferably 2–40%. (The combined weight of the solid material, here, polymer, silicate and fibrous material.) Optionally, such polymeric fibrous material could be fused within the flocced product, or finished article by using heat.

Although the cationic flocculant can be in either solid or liquid form, it is preferred to use the flocculant in a solution. Flocculation can then be achieved by combining the liquids. The cationic flocculant used can be one or more types of cations. A wide range of cationic flocculants are available such as K+, Ba++, Mg++, Al+++, Pb++, Fe++, Fe+++ and Ca++. Of these, the high charge density Al+++ is preferred. These cationic flocculants can be provided by using the appropriate salt. Acceptably, the dry weight ratio of the silicate or silicate and polymer to the cationic flocculant can be from 1:0.1 to 1:5.

The particular cationic flocculant used will have a profound effect on the characteristics of the silicate floc, and upon the articles prepared therefrom. The preferred cationic flocculants are cations containing the aminomethyleneimine moiety or diammonium cations (diamines). These flocculants are capable of giving flocced and co-flocced products having excellent tensile strength, elongation, water resistence, puncture strength, and electrical properties. When comparing these flocculants to the previously-mentioned metallic cationic flocculants, it will be found that the diamine and aminomethyleneimine cations typically prepare flocs having superior characteristics.

A preferred cationic flocculant can therefore be derived from aminomethyleneimine moiety containing compounds. Preferred compounds in this category have the formula: $[R^4(C)R^5(R^{6+}]$ wherein $R^4$, $R^5$ and $R^6$ are independently selected from $NH_2$ and $CH_3$, provided that at least two of $R^4$, $R^5$ and $R^6$ are $NH_2$, and wherein one or more of the hydrogen atoms on any one or more of $R^4$, $R^5$ or $R^6$ may be replaced by substituents, for example, $C_1$–$C_5$alkyl, $C_2$–$C_5$alkenyl or $C_2$–$C_5$alkynyl, and wherein one or more groupings of two of such substituents may be linked to form one or more rings, which may be saturated, unsaturated or aromatic. It will be appreciated that in the cation, there will be a positive charge which may be localized on one group or delocalized, giving a resonance structure, depending on the nature of the compound from which the cation is derived.

Cations having the aminomethyleneimine moiety herein refers to compounds that contain the aminomethyleneimine group which structures include compounds as: +N—C(—)=N—, and especially +N—C(—)=N— or =N—C(—N)=N—, group and resonance structure derived therefrom in which there is a delocalized double bond.

Preferred cationic aminomethyleneimine flocculants are derived from compounds selected from the group consisting of: guandine, aminoguanidine, diaminoguanidine, methylguanidine, tetramethylguanidine, melamine, 2-aminopyridine and 2,6-diaminopyridine. These can be used conveniently as a water soluble salt. Cationic aminomethyleneimine flocculants can easily be used both for flocculating the 2:1 layered silicates mixed with the polymer or for co-flocculating both the polymer and the silicate together When co-flocculating with the cationic aminomethyleneimine flocculant, it is recommended to use a minimum concentration of 0.1 molar.

A preferred set of the preferred diammonium compounds have the formula:

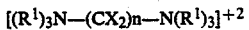

$[(R^1)_3N—(CX_2)_n—N(R^1)_3]^{+2}$ wherein (1) each $R^1$ is independently selected from hydrogen, a $C_1$–$C_8$ (one to 8 carbon atoms) straight or branched chain alkyl group, a $C_3$–$C_6$ ayclic alkyl group, or an aryl group, with the proviso that there be no more than one aryl group on each nitrogen, (2) each X is independently selected from hydrogen, an alkyl group or an aryl group and (3) n represents an integer from 2 to 15, with the option that, when n is 3 or more, the $CX_2$ groups may form ringed moieties which may be aromatic.

Another preferred set of the diamines generally corresponding to the formula:

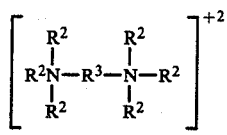

wherein (1) each $R^2$ is independently selected from hydrogen, a $C_1$–$C_8$ saturated or unsaturated straight or branched chain alkyl group, preferably $R^2$ is independently hydrogen or a $C_1$–$C_4$ straight or branched, saturated or unsaturated, hydrocarbon moiety, (2) and $R^3$ is a saturated or unsaturated, linear or branched, hydrocarbon moiety. Suitably, $R^3$ can have from 1–18 carbon atoms. Preferably $R^3$ is an alkyl group. For some of these flocculants, for example, where one or more $R^2$ has from 1–18 carbon atoms and/or where $R^3$ has from 10–18 carbon atoms it is desirable to include a polar hydrocarbon solvent in the polar liquid for the flocculant.

Other very preferred embodiments of the instant invention includes compositions prepared using diamines corresponding to the above-indicated formula where each $R^2$ is hydrogen. It is important to note that this specific group of compounds can be divided into different groups each of which can be used with the instant compositions, and with the instant process, but each group being capable of optimizing a different characteristic of the end product. For example, in order to obtain a final product having good flexibility, the diamine used should correspond to the diamines having the formula indicated above where each $R^2$ is hydrogen, and $R^3$ has from 1 to 6 carbon atoms. Specific diamine compounds which can be used to obtain added flexibility can be selected from the group consisting of: ethylene diammonium, 1,2-propanediammonium, 1,4-butanediammonium, 1,3-propanediammonium, 1,5-pentane-diammonium and diammonium methane.

A second group of diamines capable of giving outstanding strength and water resistance especially wet and dry puncture resistance and tensile strength correspond to the formula indicated above where $R^2$ is hydrogen, and $R^3$ has from 6 to 18 carbon atoms. Preferably, $R^3$ moreover is an alkyl group. In this category of the diamines, even more preferred compounds can be selected from the group consisting of: 1,6 hexanediammonium, 1,7 heptanediammonium, 1,8 octanediammonium, 1,9 nonanediammonium, 1,10 dodecanediammonium, 1,11 undecanediammonium, and 1,12 dodecanediammonium.

Another category of the diamines which is even more important for the preparation of composites, films, laminates and other articles which must have good dielectric properties are the compounds corresponding to the above formula where $R^2$ is hydrogen and $R^3$ has 8 to 18 carbon atoms. In the most preferred of this, $R^3$ is an alkyl group. The most preferred compounds in this category can be selected from the group consisting of: 1,8 octanediammonium, 1,9 nonanediammonium, 1,10 dodecanediammonium, 1,11 undecanedrammonium, and 1,12 dodeconediammonium.

One preferred embodiment uses the aminomethyleneimine moiety containing cationic flocculants with silicate/melamine-formaldehyde resin mixtures. A further embodiment of the instant invention includes films, composites and other articles which are silicate/melamine/formaldehyde resin compositions prepared using the aminomethyleneimine cations as the silicate flocculant. These cations also have a curing effect on the melamine-formaldehyde resin.

A variation of the instant invention includes the preparation of films, and other articles by preparing these materials from the dispersion after step (1) and before step (2). Conveniently, by molding, or otherwise shaping the article, or by drawing down the film and then flocculating.

A high solids content dispersion is used for such films (5 to 30% solids) and other articles. Preferably, the percent solids are from 8 to 75% in the polar liquid. This dispersion is molded or a film is drawn followed by flocculation. Flocculation is conducted by contacting film or article with the cationic flocculant to thereby destabilize the dispersion, and form the flocced product. The technique of drawing down a film from dispersed silicate is known in the art and any apparatus appropriate for this can be used to prepare the film for exposure to the flocculating agent.

The polar liquid used for the instant process is made up of polar solvents, and can include exchange ions used to swell the 2:1 layered silicates prior to flocculation. Water swellable 2:1 layered silicates can conveniently be combined with such polar solvents and a dispersion formed therefrom. The most preferred and typically used polar solvent for this is water. Other solvents which are acceptable, however, include ketones having from 1 to 8 carbon atoms, alcohols, having from 1 to 8 carbon atoms, glycols, and aldehydes having from 1 to 8 carbon atoms. The polar liquid used can have a single solvent or a mixture of solvents. It is also possible to include nonpolar organic liquids in an amount less than 10% by weight of the total amount of polar liquid. It is also possible to include salts needed when using cation exchange to prepare the swelled silicate material for the dispersion. The solvents which can be used for the polar liquid are preferably selected from the group consisting of: water, methanol, ethanol, propanol, isopropanol, butanol, formaldehyde, and glycol. Preferably, the polar liquid is a minimum of 40% by weight water. More preferably, the polar liquid is in excess of 75% by weight water; and most preferably, the polar liquid is substantially aqueous (96 or more % by weight water).

Further embodiments include compositions of matter which are combinations of 2:1 layered silicates with a specific polymer and/or a specific flocculant, optionally including fiber or pulp (preferably added during step (1)).

It has also been found that by specific selection of the preferred aminomethyleneimine or diammonium flocculants, a desired variation in properties of the films and other products prepared from the instant process can be obtained. This is particularly useful when preparing composites, laminates and molded articles, using the instant silicate-polymer compositions.

Alternatively, such articles can be made by any convenient means using the instant flocculated compositions. If desired, furthermore, materials such as fibers, fillers, curing agents, or pigments can, when the end use permits, be included, by adding or combining them with the floc. In one embodiment, a curing agent is topically applied after flocculation.

One method for the preparation of composites, a second film can be laid on top of a previously prepared wet, flocculated film. The second film would then be contacted with the cationic flocculant for flocculation. It has been found that the inclusion of a polymer in the silicate material improves adhesion between films. Depending upon the end use, it may not, therefore, be necessary to include an adhesive between the film layers. When preparing a composite, a preferred lower coefficient of thermal expansion can be obtained without the adhesive. If desired, however, such an adhesive material can be placed between the film layers before placing the subsequent films on top of the already flocculated film(s).

It has also been found that after flocculation, the silicate-polymer composition is strong enough even when wet so that washing of the composition is possible before the addition of a second layer or before the further processing of the material prepared. When preparing laminates or molded articles, after the combination of the layers, the films can be hot pressed and the articles molded with heat.

The heat and pressure used to hot-press films, laminates, and other articles will depend upon factors such as the particular ingredients in the floc, and the characteristics desired in the final product. One can improve characteristics such as tensile strength by heat processing the dried films. When hot pressing, pressures used can acceptably be from about 100 to about 2000 p.s.i., and the temperatures used can be from about 110° to about 400° C.

When a thermosetting resin is used, a curing agent can be used in the dispersion, can be added to the floc or even can be topically applied to the finished article.

One particular advantage with the instant invention is the ability to obtain transparent or translucent product material. When a transparent or translucent product is desired, it is preferred that the solids content of the dispersion be a minimum of 10% by weight polymer (preferably latex. A preferred range is from 10 to 75% be weight To increase transparency or translucency, hot pressing can be used.

Another preferred combination uses the previously described diamine or aminomethyleneimine cationic flocculants with the polybenezimidazole fibers and a polymer in a dispersion. Preferably the dispersion is co-flocculated. The preferred polymer is polyvinylidene chloride. Mica is a preferred silicate. This combination is particularly unique not only for heat and flame resistance but also for the strong, durable and water resistant articles which can be prepared from it.

The length and configuration of any fiber used with the instant process and compositions will also depend upon the final product application. In some instances, it is desired to combine the silicate polymer dispersion with a woven or non-woven fibrous substrate (including fabric and knitted material). In a prefered embodiment the dispersion is applied to the substrate followed by flocculation, and, if desired, drying and or hot pressing. When hot pressing, a temperature can be selected to intentionally melt the fiber, fusing it within the product.

When preparing paper, the fibers used can range from 1/16" to one inch in length. A preferred range would be from about ⅛ to about ¾" in length.

A polymeric pulp can also be prepared for use in a preferred embodiment of the instant invention. Pulp-like material can be prepared using polymeric substances by introducing a dissolved polymer solution into a precipitant medium while simultaneously applying a shear force. This pulp-like material can then be added to the 2:1 silicate dispersion. In a preferred embodiment, the high solids content dispersion is applied to the dried pulp-like material followed by flocculation.

The examples which follow are offered to illustrate the instant invention, and accordingly, should not be taken to limit it. All parts and percentages are by weight unless otherwise indicated.

EXAMPLE 1

Part A

Seven grams (g) of a carboxylated NBR latex at 42% solids (Reichold) was added to 150 g of a 10% solids lithium fluorhectorite dispersion. The mixture was allowed to stir for about 2 hours forming a stable dispersion containing the synthetic mica and the latex. A film was then made with this dispersion using a 4.0 mil Bird applicator to draw down a film of the dispersion on a glass plate. The glass plate with the film attached was then immersed in a 0.2M (molar) guanidine hydrochloride solution which was 60° C. A skin began to form immediately on the film. The film was allowed to stay in the bath for an additional 15 minutes. The glass plate with the film attached was then removed from the salt solution and was washed with deionized water and air-dried. It should be noted that upon removal of the film from the salt bath, that the salt bath which had been clear, was now somewhat milky white, indicating that some of the latex initially mixed in the silicate dispersion had washed out upon submersion of the film into the salt bath. Shown below are the puncture strengths of the film prepared above and a comparison to a guanidinium fluorhectorite film prepared from a 10% lithium fluorhectorite dispersion containing no latex. (The same apparatus and method was used to prepare the flocculated guanidinium fluorhectorite film as is described above for the guanidinium fluorhectorite NBR latex film.)

PUNCTURE RESISTANCE TEST

A sample of the prepared film was secured in a retaining device which held the film securely. A stylus which could be loaded was then impinged on the film in the direction normal to the surface of the film and loaded with increasing weight until the stylus penetrated the film. The results of the test are recorded in grams per millimeter.

TABLE 1

| Film | Dry Puncture Resistance (gr/mm) |
|---|---|
| Guanidinium Fluorhectorite | 7,100 |
| Guanidinium Fluorhectorite/NBR Latex | 8,200 |

As seen, the film containing the NBR latex is slightly higher in puncture resistance than the film containing no latex.

Part B

Seven grams (g) of the same carboxylated NBR latex at 42% solids (Reichold) as was used in Part A was added to 150 g of a 10% solids lithium fluorhectorite dispersion. The same procedure and apparatus as was described in Part A was used to prepare a film of this dispersion. The glass plate with the film attached was then immersed in a 0.25M 1,6-hexanediamine dihydrochloride solution which was also at 60° C. Flocculation and processing continued as described in Part A except that unlike the film of Part A which also contained the same amount of the same latex, the salt bath was fairly clear after the removal of the film, implying that most of the latex was retained in the film. Using the same previously described procedure, a second 1,6-hexanediammonium fluorhectorite film was prepared but without the addition of latex. This film was similarly dried and also tested for puncture resistance. The results of the puncture resistance test for these films is shown below.

TABLE 2

| Film | Puncture Resistance (gr/mm) |
|---|---|
| 1,6-Hexanediammonium Fluorhectorite | 13,000 |
| 1,6-Hexanediammonium Fluorhectorite/ NBR Latex | 18,000 |

As seen from these results, the puncture strength of the films containing the NBR latex are much higher than those without the latex. This effect of the latex on the film seems to be more prominent when the 1,6-hexanediammonium ions rather than the guanidinium ions are used in the film-making process. This could be due to some of the latex being washed out as was evident by the milky color of the guanidine hydrochloride salt bath. The guanidinium, therefore, fully flocculated only the mica. There was not a complete flocculation of the NBR. The diammonium, however, flocculated both the silicate and the NBR effectively.

It should also be noted that the presence of the NBR latex in the films allowed the films to be translucent rather than pure white as obtained when no latex is present.

An increase in the NBR latex content will make even more transparent and films. Thus, if a more transparent film is desired it is preferred to use the latex in an amount of from 20 to 60% by weight of the total amount of the solids.

EXAMPLE 2

Using moderate homogenization, a dispersion was prepared by combining 400 g of a 12% solids dispersion of water swellable vermiculite with 58.2 g of Teflon ® 120 FEP, a water based dispersion of hexafluoropropylene-tetrafluoroethylene copolymer particles (0.1–0.25 microns in diameter) and stabilized with 6% of a mixture of volatile non-ionic and anionic wetting agents. Solids content of the FEP is 60% by weight. Heat fusability of the FEP 300°–330° C. A film was drawn down and flocculated with 1,6-hexanediamine dihydrochloride (0.5 normal solution). The film was air dried at ambient temperature and subsequently exposed to a high temperature pre-bake to drive off the volatile wetting agents. The film has a thickness of 1.7 mils and a density of 87.8 lbs./cu. ft. Four plies of this film were hot pressed at 305° C. for 1 hour to produce a smooth, metallic appearing laminate with a thickness of 4.6 mils and a density of 126 lbs./cu. ft. The laminate exhibit a very low dielectric constant of 3–3.5 at 1 MHz frequency that is particularly desirable for electronic applications such as printed wiring boards.

EXAMPLE 3

7.5 grams of a polystyrene based latex (LYTRON ® 607) was added to 100 grams of a 12% solids vermiculite dispersion. The mixture was homogenized for approximately one hour yielding a stable dispersion containing the vermiculite and the polystyrene latex. A film was then made with this dispersion using a 10 mil Byrd applicator to draw down a film of the dispersion on a glass plate. The glass plate with the film attached was then immersed in a 0.5 Molar (M) 1,6-hexanediamine dihydrochloride solution which was at 60° C. A skin formed immediately on the film. The film was allowed to stay in the bath for an additional 30 minutes. The glass plate with the film attached was then removed from the flocculating solution and washed with deionized water and air dried. The dielectric properties of the film prepared were then tested and the results are shown below. Also included are the dielectric properties of a film which was cast from the vermiculite/polystyrene dispersion but was never flocculated.

The third film included in the table below is a film which was prepared from a 12% vermiculite dispersion containing no polystyrene latex. This film was flocculated in 1,6-hexanediammonium dihydrochloride. All of the films, prepared in the same manner, were then exposed to a 150° C. heat treatment for one hour after which they were allowed to set at room temperature and at approximately 50% relative humidity for several days before testing the dielectric properties. The dielectric properties were all measured at room temperature and 50% relative humidity at 100 Hz and 1 MegaHz.

TABLE III

| Film | Dielectric permittivity | | Dissipation Factor | |
|---|---|---|---|---|
| | 100 Hz | 1 MegaHz | 100 Hz | 1 MegaHz |
| 1,6-hexanediammonim vermiculite (no polystyrene) | 100 | 8.0 | 1.1 | 0.15 |
| 1,6-hexanediamonium vermiculite & polystyrene | 10 | 5.2 | 0.24 | 0.06 |
| Vermiculite/Polystyrene Only (no flocculant) | 316 | 8 | 3.6 | 0.4 |

As seen above, the presence of both the polystyrene and the 1,6-hexanediammonium flocculant is needed in the vermiculite based films in order to produce films which do not shown a drastic change in the dielectric permittivity and dissapation factor upon going from 100 Hz. to 1 MegaHz. It is most desired in such tests that the film tested show a minimum change in the dielectric permittivity in going from 100 Hz. to 1 MegaHz. and similarly it is most desired that the dissipation factor across 100 Hz. to 1 MegaHz. be also as small as possible.

The dielectric permittivity and dissipation factors were obtained using the following general guidelines in ASTM D-150 under 3 terminal guarded electrode procedures with the following exceptions:

1. The samples were of necessity thinner than recommended.

2. The 3 terminal arrangement was converted to a 5 terminal to accommodate the requirements of the Hewlett-Packard 4192A low frequency network analyzer used to measure capacitants and conductants between 10 Hz. and 10 MHz. The electrode used were either vacuum deposited gold or painted silver (Electrodag ® 504).

The low electrode was 1.25" in diameter and the same thickness was approximately 1 mil. Standardization was done by determining the dielectric permittivity of Teflon ® sheets of similar thickness with the same types of electrodes. The Teflon values obtained agreed with literature values to 2%.

EXAMPLE 4

Vermiculite paper of the following composition was manufactured on a Fourdrinier pilot plant machine:

| | |
|---|---|
| Vermiculite | 76.4% |
| PBI (Polybenzimidazole) fibers | 17.6% |
| PVDC (Polyvinylidene chloride) binder | 6.0% |
| TOTAL | 100.00% |

Procedure

The following fiber slurry was prepared in a standard paper-making beater:

| | |
|---|---|
| PBI Fibers, ¼" & ½" Lengths | 8.8 Lbs. |
| Water-Deionized | 63.4 Gal. |

The fibers were beaten for ten minutes.

The following mixture was prepared in a standard Hydrapulper:

| | Dry Weight | Wet Weight |
|---|---|---|
| Vermiculite Gel | 38.2 Lbs. | 478 Lbs. |
| PBI Fiber Slurry (Above) | 8.8 Lbs. | |
| PVDC Latex (50% Solids) | 3.0 Lbs. | 6 Lbs. |
| | 50.0 Lbs. | |

The gel and fibers were first mixed together in the hydrapulper for ten minutes; then the latex was added and the resultant mixture was stirred for one minute more.

The next step, flocculation, was performed by pumping the above mixture into a precipitation tank, which contained the following:

| | | |
|---|---|---|
| Water-Deionized | 500 | Gallons |
| Guanidine Hydrochloride | 80 | Lbs. |
| Alum (Papermaker's) | 1.5 | Lbs. |
| Soda Ash | 1.35 | Lbs. |

The total volume of the resultant stock was adjusted to 750 gallons of 0.8% consistency. After a further period of mixing, the stock was pumped to the headbox of the paper forming unit. Paper of 10 mil thickness was then manufactured. The paper was 25" in width and was collected onto rolls after traveling over the drying drums of the paper manufacturing line.

The resultant paper was tested and found to have the properties listed below. The tests performed are standard tests used in this field. (TAPPI stands for Technical Association of Pulp and Paper Industries, the test and its designated identification number is listed along with the results.)

| TEST | RESULT |
|---|---|
| Thickness TAPPI T-401 | 0.010" |
| PH (cold extraction) | 7.1 |
| Water Absorption (TAPPI) T-492 | 2 hr 34% |
| | 24 hr 44% |
| Tensile Strength (TAPPI) T-494 | MD 1433 psi |
| | AMD 1194 psi |
| Elongation at break T-4q4 | MD 2.6% |
| | AMD 3.4% |
| Elmendorf Tear TAPPI T-414 | MD 184 g |

| TEST | RESULT |
|---|---|
| | AMD 176 g |
| MIT Fold (TAPPI) T-423 | MD 4214 dbl folds |
| | AMD 3060 dbl folds |
| Mullen Burst (TAPPI) T-403 | 42 psi |
| Density (TAPPI) T-410 | 42 pcf |
| Dielectric Strength | |
| ASTM D-149 | 424 v/mil |
| Calendered | 750 v/mil |
| Toughness Index | MD 371 J/kg |
| | AMD 434 J/kg |
| Wax Pick Test (TAPPI) T-459 | 6, pulls at 7 |
| Limiting Oxygen Index (LOI) | does not burn in 100% oxygen |
| Moisture at | |
| 65% RH | 2.8% |
| 50% RH | 2.0% |
| Specific Heat Capacity | 0.36 cal/g. degree C. |
| Volume Resistivity | 3.75 × 10$^9$ ohm · cm |
| Radiant Panel Test E-162 | |
| Flame Spread Factor | 1.00 |
| Heat Evolved | 3.21 |
| Flame Spread Index | 3.21 |
| NBS Smoke Test | |
| Smoldering | 7 |
| Flaming | 8 |
| Mean | 7 |
| Vertical Burn Text F-501 | |
| 12 second duration | |
| Extinguish time | 0 sec |
| Burn length | 2.4" |
| Glowing | 0 sec |
| Dripping | 0 sec |
| Pass/Fail | P |
| 60 second duration | |
| Extinguish time | 0 sec |
| Burn length | 4.5" |
| Glowing | 1 sec |
| Dripping | 0 sec |
| Pass/Fail | P |

MD — Machine Direction
AMD — Across Machine Direction

EXAMPLE 5

The following materials were combined with (500 ml.) of water and stirred to form a dispersion:

| | |
|---|---|
| Vermiculite | 13.65 g |
| PBI ⅛" | 0.1 g |
| PBI ¼" | 0.4 g |
| PBI ½" | 0.3 g |
| Polyvinylidine chloride | 0.5 g |
| | 14.95 |

This dispersion was then added to the following solution:

Guanidine HCl 80 g/in 4 liters (1) of H$^2$O
5 cc 10% Alum
8 cc 10 Na2CO3

Upon combination of the solutions, the polyvinylidene chloride and vermiculite were flocculated. The resultant mixture was stirred for one minute and then drained. The flocculated product was then pressed at a wet press pressure of 600 gauge into a paper sheet of approximately 10 mil thickness.

The tensile strength was measured (TAPPI T-494) at 1593 psi.

Tear strength was measured using Elmendorf Tear (TAPPI T-414) Test, and was measured at 64 g.

The MIT Fold Test (TAPPI) T-423 are performed and found to be 1588 double folds.

Elongation tensile strength was also measured with the TAPPI method of T-494 at 3.9%.

The Mullen Burst Test (TAPPI) T-403 was performed and measured at 31 psi.

EXAMPLE 6

A dispersion was prepared using 500 ml. of water with the materials listed in Group I. This dispersion was then added to the flocculating agent described in Group 2. A flocculated product was obtained, drained, subjected to aspirator pressure vacuum for seventeen second drain time and wet pressed into a paper sheet at a gauge pressure of 600 lbs. wet press conditions. The sheet was dried and tested. The tests and results are indicated below.

| GROUP I | |
|---|---|
| Vermiculite | 7.9 g |
| Owens-Corning (10) Fiberglass | 3.15 |
| Owens-Corning (1/16") Fiberglass | 1.6 |
| Polybenzimidazole (PBI) ¼" | |
| PBI ¼" | |
| PBI ¼" | 0.2 |
| Polyvinylidene chloride (Geon ® 660X13) | 1.5 |
| GROUP II | |
| Guanidine HCl 80 g/4 L H²O | |
| 5 cc 10% Alum | |
| 8 cc 10% Na2CO3 | |
| Tests and Results | |
| Tensile Strength (TAPPI T-494) | 1593 psi |
| Elmendorf Tear (T-414) Tear Strength: | 64 g |
| Elongation Tensile TAPPI T-494 | 1.3% |
| Mullen Burse TAPPI T-403 | 18 psi |
| MIT Fold TAPPI T-423 | 11 dbl flds |
| Water Absorption (TAPPI T-492) | 115%, 137% 2 hr |

EXAMPLE 7

36 g of lithium taeniolite having an average particle size of 22 microns was homogenized in 264 g of deionized water to produce a dispersion at 12% solids. Then, 9 g of a bismaleimide-type polyimide resin (Kerimid ®—601 powder available from Rhone Roulenc Co.) was added and the dispersion was homogenized at high speed for 15 minutes. A 10 mil wet film was cast from the pale yellow dispersion in the manner described in Example 1.

The film was then flocculated by immersing it in a 0.2N solution of melamine hydrochloride solution (PH of 3.5) at a temperature of 55°–60° C.

Air drying at ambient temperature resulted in a pale yellow film that was 2.4 mils thick.

8 plies of the above film were hot pressed at 50 psi for 1 hour at a temperature of 175° C. The tan colored laminated so produced had a thickness of 21 mils and a density of 75 lbs/cu. ft. The Tg of the laminate composite was found to be 270° C. as measured by DSC (Differential Scanning Calormeter).

The laminate was fairly resistant to fracture and, more importantly, did not delaminate upon fracturing. In comparison, a similar laminate not containing the polyimide binder was topically coated with the Kerimid ® polyimide (applied from N-methylpyrollidone solution) exhibited internal delamination when fractured.

EXAMPLE 8

This example is intended to compare the instant process with an alternative process also preparing a silicate and polymer combination. The instant coflocculated process is shown in Part B and the alternate process in Part A.

Part A

The vermiculite for Part A was dispersed and flocced to obtain the 10 g. of the material needed for the paper. The floc was made by: A dispersed vermiculite was prepared by combining 877 grams (g.) of vermiculite and 1,000 g. of water. The resulting dispersed vermiculite was then added and one normal magnesium sulfate solution to form the vermiculite floc.

To prepare the paper, fibers of the following description, 5 g. of fiberglass, 1/16" fiberglass 0.5 g., ¼" glass 1 g., and ¼" polyphenylenesulfide fiber 1.0 g. were added to 4 liters of water and 10 g. of the previously prepared vermiculite flocculation; then 5 cc. of 10% alum and 8 cc. of 10% NA2CO3 (base) was added; and then 2 g. of polyvinylidene chloride latex was combined. The combination was mixed and the slurry poured into a sheet mold, drained, and a paper made therefrom.

The paper product was tested for tensile strength, wax pick test, Elmondorf test, MIT fold, Mullen burst and water absorption. For the Elmendorf tear test, the paper of this example was the same as Example B. For all other tests, however, the coflocculated paper produced in Part B was superior. See results in Table 8 under Part C.

Part B

This experiment used the identical vermiculite fiber composition, latex, aqueous concentrations, and amounts which were used in Part A. This part, however, demonstrates the coflocculated process of the instant invention. A homogeneous dispersion was prepared of the following ingredients: 4 liters of water, 10 g. of vermiculite, and the same fibers previously indicated. Two g. of polyvinylidenechloride latex was also added to the mixture of fibers and vermiculite. The solids content of the mixture was thus 52% by weight fiber, 40% by weight vermiculite and 8% by weight polymer. The total weight of the solids content was 25 g.

This combination is identical to the combination both by weight and ingredients which was used in Part A. In this instance, however, the vermiculite, the fibers and the polymer were all mixed before adding them to the 4 liters of water containing the flocculant. The flocculant was also 5 cc. of 10% alum. As in Part A, a sufficient amount of base was also included to make the mixture basic. After a short period of mixing, the slurry was poured into a sheet mold, drained and a paper was made from this stock using the identical equipment and procedure which was used to prepare the paper made from Part A. The paper was then tested using the tests and methods listed in the table of Part C. The paper prepared from the material of Part B had the same value for the Elmendorf tear test (15 g.) as the material of Part A, but in all other tests listed in Part C, the paper of Part B was superior.

Part C

TABLE 8

| | A | B |
|---|---|---|
| Thickness | 0.012" | 0.013" |
| Tensile Strength T-494 | 890 psi | 1880 psi |
| Wax Pick Test (TAPPI)(T-459) | Pulls at 2 | Pulls at 8 |
| Elmendorf Tear | 15 g. | 15 g. |
| MIT Fold T-423 | 9 dbl. folds | 723 dbl. folds |
| Water Absorption Exposure (24 hours immersion) | 64% incr. | 53% incr. |

EXAMPLE 9

The following ingredients were combined with 500 milliliters (ml.) of water:

| Formula % By Weight: | |
|---|---|
| Vermiculite | 12.74 g. |
| PBI ¼" | 1.13 g. |
| Acylonitrile (Hycar ® 1562) Latex | 1.13 g. |

After stirring to form the dispersion, these ingredients were added to the following aqueous solution of cationic flocculant:
Guanidine HCL 80 g/4 liters (L) $H_2O$
5 cc. 10% alum
8 cc. 10% $Na_2CO_3$ (base)

Data

Tensile Strength (T-494) 1921 psi
Tear Strength (T-414) 96 g.
Fold MIT (T-423) +5000 dbl. folds Flocculation took place and the resulting slurry was gravity drained and the material was made into a sheet of paper on a wet press with a 600 psi g. (gauge) pressure.

The resulting paper was 0.007" (inch) thick. The following data was collected in testing the paper:
Water Absorption: 34.8% by weight after 24 hour exposure.

EXAMPLE 10

The following ingredients were combined with 500 milliliters (ml.) of water:

| Formula % By Weight: | |
|---|---|
| Vermiculite | 12.74 g. |
| PBI ¼" | 1.13 g. |
| Acylonitrile (Hycar ® 1561) Latex | 1.13 g. |

After stirring to form the dispersion, these ingredients were added to the following aqueous solution of cationic flocculant:
Guanidine HCL 80 g/4 liters (L) $H_2O$
5 cc. 10% alum
8 cc. 10% $NA_2CO_3$ (Base)

Flocculation took place and the resulting slurry was gravity drained and the material was made into a sheet of paper on a wet press with a 600 psi g. (gauge) pressure.

The resulting paper was 0.006" thick. The following data was collected in testing the paper:

Data

Tensile Strength (T-454) 2022 psi
Tear Strength (T-414) 75 g.
Fold MIT (T-423) +5000 dbl. folds
Water Absorption: 38.6% by weight after 24 hour exposure.

EXAMPLE 11

The following ingredients were combined with 500 milliliters (ml.) of water:

| Formula % By Weight: | |
|---|---|
| Vermiculite | 12.74 g. |
| PBI ¼" | 1.13 g. |
| Fluorocarbon Teflon ® Latex | 1.13 g. |

After stirring to form the dispersion, these ingredients were added to the following aqueous solution of cationic flocculant:
Guanidine HCL 80 g/4 liters (L) $H_2O$
5 cc. 10% alum
8 cc. 10% $NA_2CO_3$ (base)

Flocculation took place and the resulting slurry was gravity drained and the material was made into a sheet of paper on a wet press with a 600 psi g. (gauge) pressure.

The resulting paper was 0.008" (inch) thick. The following data was collected in testing the paper:

Data

Tensile Strength (T-494) 1607 psi
Tear Strength (T-414) 91 g.
Fold MIT (T-423) +5000 dbl. folds
Water Absorption: 41.5% by weight after 24 hour exposure.

EXAMPLE 12

The following ingredients were combined with 500 milliliters (ml.) of water:

| Formula % By Weight: | |
|---|---|
| Vermiculite | 12.74 g. |
| PBI ¼" | 1.13 g. |
| Carboxylic Acrylic (HYCAR ®) Latex | 1.13 g. |

After stirring to form the dispersion, these ingredients were added to the following aqueous solution of cationic flocculant:
Guanidine HCL 80 g/4 liters (L) $H_2O$
5 cc. 10% alum
8 cc. 10% $NA_2CO_3$ (base)

Flocculation took place and the resulting slurry was gravity drained and the material was made into a sheet of paper on a wet press with a 600 psi g. (gauge) pressure.

The resulting paper was 0.007" thick. The following data was collected in testing the paper.

Data

Tensile Strength (T-454) 2248 psi
Tear Strength (T-414) 91 g.
Fold MIT (T-423) +5000 dbl. folds
Water Absorption: 30.57% by weight after 24 hour exposure.

EXAMPLE 13

The following ingredients were combined with 500 milliliters (ml.) of water:

| Formula % By Weight: | |
|---|---|
| Vermiculite | 12.74 g. |
| PBI ¼" | 1.13 g. |
| Neoprene ® 735A Latex | 1.13 g. |

After stirring to form the dispersion, these ingredients were added to the following aqueous solution of cationic flocculant:

Guanidine HCL 80 g/4 liters (L) H₂O
5 cc. 10% alum
8 cc. 10% NA₂CO₃ (base)

Flocculation took place and the resulting slurry was gravity drained and the material was made into a sheet of paper on a wet press with a 600 psi g. (gauge) pressure.

The resulting paper was 0.008" thick. The following data was collected in testing the paper.

Data

Tensile Strength (T-454) 1781 psi
Tear Strength (T-414) 112 g.
Fold MIT (T-423) +5000 dbl. folds
Water Absorption: 28.3% by weight after 24 hour exposure.

EXAMPLE 14

The following ingredients were combined with 500 milliliters (ml.) of water:

| Formula % By Weight: | |
|---|---|
| Vermiculite | 12.74 g. |
| PBI ¼" | 1.13 g. |
| Polyvinylidine Chloride Latex | 1.13 g. |

After stirring to form the dispersion, these ingredients were added to the following aqueous solution of cationic flocculant:

Guanidine HCL 80 g/4 liters (L) H₂O
5 cc. 10% alum
8 cc. 10% NA₂CO₃ (base)

Flocculation took place and the resulting slurry was gravity drained and the material was made into a sheet of paper on a wet press with a 600 psi g. (gauge) pressure.

The resulting paper was 0.008" (inch) thick. The following data was collected in testing the paper:

Data

Tensile Strength (T-494) 1946 psi
Fold MIT (T-423) +5000 dbl. folds
Water Absorption: 26.5% by weight after 24 hour exposure.

EXAMPLE 15

The following ingredients were combined with 500 milliliters (ml.) of water:

| Formula % By Weight: | |
|---|---|
| Vermiculite | 13.65 g. |
| PBI ⅛" | 0.1 g. |
| PBI ¼" | 0.25 g. |
| PBI ½" | 0.25 g. |
| Fluorocarbon Teflon ® Latex (60%) | 17.1 g. |

After stirring to form the dispersion, these ingredients were added to the following aqueous solution of cationic flocculant:

Guanidine HCl 80 g/4 liters (L) H₂O
5 cc. 10% alum
8 cc. 10% NA₂CO₃ (base)

Flocculation took place and the resulting slurry was gravity drained and the material was made into a sheet of paper on a wet press with a 600 psi g. (gauge) pressure.

The resulting paper was 0.008" (inch) thick. The following data was collected in testing the paper:

Tensile Strength (T-494) 1592 psi
Tear Strength (T-414) 91 g.
Fold MIT (T-423) +5000 dbl. folds
Water Absorption: 49.2% by weight after 24 hour exposure.

EXAMPLE 16

A synthetic fluormica paper of the following composition was manufactured on a four drinier pilot plant machine:

| | |
|---|---|
| Taeniolite (A synthetic fluormica) | 76.5% by wt. |
| Polybenzimidazole fibers | 17.0% |
| Polyvinylidene chloride | 6.5% |
| TOTAL: | 100.0% |

Procedure

The following fibrous slurry was prepared in a standard papermaking beater:

| | | |
|---|---|---|
| PBI Fibers | 8.5 | lbs. |
| ¼" lengths | 2.83 | lbs. |
| ½" lengths | 5.67 | lbs. |
| Water (deionized) | 63.4 | gallons |

The fibers and water were beaten for ten minutes. The mixture was then combined with Topy ® Li Taeniolite (38.2 lbs.) and polyvinylidene chloride latex (Geon ® 660×13).

The mica, fibers and water were mixed together in the hydropulper for ten minutes after which time the polyvinylidene chloride latex (50% solids) was added. After one minute more mixing, flocculation was performed by pumping this mixture into a precipitation tank containing the following cationic flocculant solution:

| | | |
|---|---|---|
| Deionized Water | 500 | gallons |
| Guanidine HCL | 80 | lbs. |
| Alum | 1.635 | lbs. |
| Sodium Carbonate | 1.39 | lbs. |

After another mixing period, the stock was pumped into the head box of the paper-forming unit. A paper of 25" in width was collected onto rolls after traveling over the drying drums of the paper manufacturing line.

The resulting paper was tested. The tests and data collected are listed below:

| TEST | RESULT |
|---|---|
| Thickness | 0.014" |
| pH | 8.37 |
| Water Absorption | 2 hr 65.4% |
| | 24 hr 81.6% |
| Tensile Strength (Machine Direction) | MD 757 psi |
| | AMD 609 psi |
| Elongation at Break T-494 | MD 1.25% |
| | AMD 1.7% |
| Elmendorf Tear TAPPI T-414 | MD 189 g |
| | AMD 149 g |
| MIT Fold (TAPPI) T-423 | MD 584 dbl folds |
| | AMD 227 dbl folds |

| TEST | RESULT |
|------|--------|
| Mullen Burst (TAPPI) T-403 | 33 psi |
| Density (TAPPI) T-410 | 40.1 pcf |
| Dielectric Strength | |
| ASTM D-149 | 342 v/mil |
| Calendered | 529 v/mil |
| Toughness Index | MD 107 J/kg |
| | AMD 120 J/kg |
| Wax Pick Test (TAPPI) T-459 | 2, pulls at 3 |
| Moisture at 65% RH | 4.5% |
| NBS Smoke Smoldering 16, Flaming 24, Mean 20 | |
| Vertical Burn Test F-501 | |
| 12 second duration | |
| Extinguish time | 0 sec |
| Burn length | 1.0" |
| Glowing | 0 sec |
| Dripping | 0 sec |
| Pass/Fail | P |
| 60 second duration | |
| Extinguish time | 0 sec |
| Burn Length | 1.6" |
| Glowing | 0 sec |
| Dripping | 0 sec |
| Pass/Fail | P |

EXAMPLE 17

In order to test how effective the salt solutions are in flocculating the latix the following experiments were run. 0.25 g of the NBR latex were added to 100 ml. of 0.2M, 0.25M, 0.35M and 0.5M solutions of either guanidinium hydrochlorid or 1,6 hexane deammonium dihydrochloride solutions. Also in another set of experiments 4 g of lithium fluorhectorite at 10% solids was added to 100 mls. of a 0.2, 0.25M, 0.35M and 0.5M solutions of either guanidinium hydrochloride or 1,6 diammonium dihydrochloride solution. The appearance of the salt solution and the material added (i.e., the latex and silicate) to the salt solutions were monitored. The observations are shown in Table 17. As seen, both guanidinium and 1,6 hexane diammonium solutions are capable of flocculating the fluohectorite. On the other hand, the flocculation of the latex is highly dependent on the type of salt solutions used and the concentration of the salt solution. From these experiments and results in Example 1, Part A & B, it can be seen that when coflocculation is desired the type of latex and flocculant selected is important.

TABLE 17

| Salt Solution | Appearance After NBR Latex Added | Appearance After Lithium Fluorhectorite Added |
|---|---|---|
| .20 M Guanidinium hydrochloride | salt bath milky portion of latex flocculated | salt bath clear silicate flocculated |
| .20 M 1,6 hexane diammonium dihydrochloride | salt bath clear latex flocculated | salt bath clear silicate flocculated |
| .25 M Guanidinium hydrochloride | salt bath slightly milky portion of latex flocculated | salt bath clear silicate flocculated |
| .25 M 1,6 hexane diammonium dihydrochloride | salt bath clear latex flocculated | salt bath clear silicate flocculated |
| .35 M Guanidinium hydrochloride | salt bath clear latex flocculated | salt bath clear silicate flocculated |
| .35 1,6 hexane diammonium dihydrochloride | salt bath clear latex flocculated | salt bath clear silicate flocculated |
| 0.50 M Guanidinium hydrochloride | salt bath clear latex flocculated | salt bath clear silicate flocculated |
| 0.50 M 1,6 hexane diammonium dihydrochloride | salt bath clear latex flocculated | salt bath clear silicate flocculated |

EXAMPLE 18

EXAMPLE ILLUSTRATING EFFECT OF POLYIMIDE CONCENTRATION EXCHANGE CATION AND THERMAL TREATMENT ON TENSILE STRENGTH

As previously described, a series of vermiculite-polyimide dispersions of the following compostions were prepared:

| MATERIALS | COMPOSITION A (15% RESIN) | COMPOSITION B (30% RESIN) | COMPOSITION C (50% RESIN) |
|---|---|---|---|
| Vermiculite | 400 g | 400 g | 400 g |
| Kerimid ™ 601 (Polyimide) | 8.73 g | 21.3 g | 48 g |

Following the procedure previously described, 10 mil wet films were cast and subsequently flocculated in the following aqueous cation exchange.

| | solutions: |
|---|---|
| K | 0.5 M potassium chloride |
| BDA | 0.25 M 1,4 butanediammonium chloride |
| HMD | 0.5 M 1,6 hexanediammonium chloride |

The films were air dried at ambient temperature. Tensile strength was measured on pressed and unpressed samples exposed to various heat cycles. The press cycle employed was as follows:
Place in press at ambient temperature and pressurize to 250 psi.
Raise temperature to 220° C. and hold for 1 Hr.
Raise pressure to 500 psi and hold for 1 Hr.
Cool to ambient temperature and remove.
One set of samples was given a post bake treatment of 220° C. for 24 Hrs. Tensile properties are summarized in the table shown on the next page.

| Cationic Flocculant | Composition | TENSILE (psi) | | | | | | |
|---|---|---|---|---|---|---|---|---|
| | | Tensile (psi) Unpressed | | | | Tensile (psi) Pressed | | |
| | | Ambient | Oven 150 C/1HR | Oven 150 C/1 HR 50% RH-3 Days | Oven 150 C/3 HR | Ambient | Prebake 150 C/3 HR | Prebake 150 C/3 HR; Postbake |
| BDA | A | 3286 | 7222 | 4852 | 8502 | 11093 | 12754 | 11766 |
| HMD | A | 5581 | 8308 | 6759 | 6813 | 15238 | 12672 | 7345 |
| K | A | 3931 | 7754 | 3462 | 7019 | | 9336 | 9848 |
| BDA | B | 1756 | 4040 | 2927 | 4646 | 11209 | 8887 | 7810 |
| HMD | B | 3170 | 3733 | 3413 | 3722 | 11155 | 8636 | 4111 |
| K | B | 2193 | 5539 | 2546 | 4679 | | 7723 | 6058 |
| BDA | C | 1365 | 2401 | 1906 | 2682 | 10609 | 7730 | 6023 |
| HMD | C | 1373 | | | | 9430 | 5594 | 5502 |
| K | C | 1084 | 2899 | 1753 | 3073 | 8200 | 6329 | 5356 |

It is significant to note that:
1. Hot pressing significantly increases the Tensile strength of the films.
2. Prior to heating, the BDA (1,4 Butane Diamine) cation produced the lowest Tensile strength of the three cations. After heating and particularly after pressing, the order is reversed in that BDA, in general, produced the highest Tensile values.

What is claimed is:

1. A process for a water resistant floc of polymer and a 2:1 layered silicate comprising:
    (1) preparing a co-dispersion of (a) a 2:1 layered silicate having an average charge per structural unit of from −0.4 to about −1.0 which is selected from mica and vermiculite, said silicate having interstitial cations that promote swelling, (b) a polymer having a molecular weight of at least 50,000, and (c) a polar liquid; and (2) contacting the co-dispersion with a cationic flocculant thereby destabilizing the co-dispersion and forming a silicate floc also containing the polymer.

2. A process described in claim 1, wherein the polymer is characterized in that it is not dispersible in the polar liquid, but the said polymer can be dispersed in the silicate dispersed in the polar liquid.

3. A process as described in claim 2 wherein the polar liquid is substantially aqueous.

4. A process as described in claim 2 wherein the polar liquid is selected from the group consisting of glycol, water, acetone, methanol, ethanol, propanol, isopropanol, and butanol.

5. A process as described in claim 3 wherein the polymer is polyimide.

6. A process as described in claim 2 wherein the cationic flocculant is a diammonium compound.

7. A process as described in claim 6 wherein the diammonium compound has the formula:

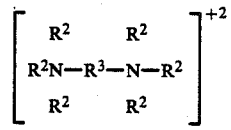

wherein (1) each R2 is independently selected from hydrogen, and a C1-C8 saturated or unsaturated, striaght or branched chain alkyl group; and wherein (2) R3 is selected from, a saturated or unsaturated, branched or linear alkyl group, having from 1 to 18 carbon atoms or an aryl group having from 1 to 18 carbon atoms.

8. A process as described in claim 7 wherein each R2 is hydrogen.

9. A process as described in claim 2 wherein after step (1) a film is prepared with the co-dispersion and then, the film is contacted with the cationic flocculant in step (2).

10. A process as described in claim 9 wherein after step (2) the film is dried and hot pressed.

11. A process as described in claim 2 wherein the cationic flocculant is an aminomethyleneimine cation.

12. A process as described in claim 2 wherein the cationic flocculant is a compound having the formula:

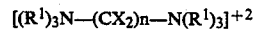

wherein (1) each R$^1$ is independently selected from hydrogen, a C$_1$-C$_8$ straight or branched chain alkyl group, a C$_3$-C$_6$ ayclic alkyl group, or an aryl group, with the proviso that there be no more than one aryl group on each nitrogen, (2) each X is independently selected from hydrogen, an alkyl group or an aryl group and (3) n represents an integer from 2 to 15, with the option that, when n is 3 or more, the CX$_2$ groups may form ringed moieties which may be aromatic.

13. A process as described in claim 2 wherein the polymer is also flocculated.

14. A process as described in claim 1, wherein after Step (1), a film is prepared with the co-dispersion and then the film is contacted with the cationic flocculant in Step (2).

15. A process as described in claim 14 wherein, after Step (2), the film is dried and then hot pressed.

16. A process as described in claim 14 wherein the cationic flocculant is an aminomethyleneimine cation.

17. A process as described in claim 14 wherein the cationic flocculant is a diammonium cation.

18. A process as described in claim 1, wherein the polymer is characterized in that it is dispersible in the polar liquid.

19. A process as described in claim 18 wherein the cationic flocculant is a diammonium compound.

20. A process as described in claim 18 wherein the cationic flocculant is a cation having the formula:

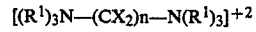

wherein (1) each R$^1$ is independently selected from hydrogen, a C$_1$-C$_8$ straight or branched chain alkyl group, a C$_3$-C$_6$ ayclic alkyl group, or an aryl group, with the proviso that there be no more than one aryl group on each nitrogen, (2) each X is independently selected from hydrogen, an alkyl group or an aryl group and (3) n represents an integer from 2 to 15, with the option that, when n is 3 or more, the $CX_2$ groups may form ringed moieties which may be aromatic.

21. A process as described in claim 18 wherein the polymer is also flocculated.

22. A process as described in claim 18 wherein the cationic flocculant is an aminomethyleneimine cation.

23. A process as described in claim 1 wherein the co-dispersion of Step (1) is applied to a woven fibrous substrate and then is contacted with the cationic flocculant in Step (2).

24. A process as described in claim 1 wherein the co-dispersion in Step (1) also contains fibers.

25. A process as described in claim 1 wherein the co-dispersion of Step (1) is molded and then contacted with the cationic flocculant in Step (2).

26. A water-resistant silicate and polymer material comprising a polymer having a molecular weight of at least 50,000 which is intermixed homogeneously in a flocculated, swelled 2:1 layered silicate having an average charge per structural unit that ranges from about $-0.4$ to about $-1$, wherein said silicate is selected from mica and vermiculite, and contains at least some diamine interstitial cations.

27. The material of claim 26 also containing non-woven fiber.

28. The material of claim 26 further comprising a woven fibrous substrate.

29. A material as described in claim 26 which was prepared by contacting a co-dispersion of the polymer and a swelled 2:1 layered silicate having interstitial cations that promote swelling, and which was selected from mica and vermiculite, with a diamine cationic flocculant thereby causing an ion exchange and destabilizing the co-dispersion to form a silicate floc also containing the polymer.

30. A material as described in claim 29 wherein the diamine cationic flocculant simultaneously flocculates the polymer, and the silicate floc.

31. The material of claim 29 also containing a non-woven fiber which was added before contacting the cationic flocculant.

32. The material of claim 29 wherein the co-dispersion was drawn into a film and then contacted with the diamine cationic flocculant.

33. The material of claim 32 which was dried and then hot pressed.

34. The material of claim 29 which also contains polybenzimidazole fibers which were added before contacting the co-dispersion with the cationic flocculant.

35. The material of claim 29 which has been formed into a laminate.

36. The material of claim 29 wherein the co-dispersion is applied to a woven fibrous substrate and then contacted with the cationic flocculant.

37. A water resistant silicate and polymer material comprising: a co-flocculated, homogeneously intermixed material of a flocculated polymer with a molecular weight of at least 50,000 and a flocculated swelled 2:1 layered silicate having an average charge per structural unit of from about $-0.4$ to about $-1.0$ wherein said flocculated swelled 2:1 layered silicate is a silicate selected from mica and vermiculite.

38. The material of claim 37 containing a diamine cation.

39. A material as described in claim 38 wherein the diamine cation has the formula:

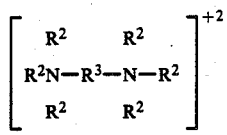

wherein (1) each R2 is independently selected from hydrogen, and a C1–C8 saturated or unsaturated, straight or branched chain alkyl group; and wherein (2) R3 is selected from a saturated or unsaturated, branched or linear alkyl group, having from 1 to 18 carbon atoms or an aryl group having from 1 to 18 carbon atoms.

40. A material as described in claim 39 wherein each R2 is hydrogen.

41. A material as described in claim 40 wherein R3 is the saturated or unsaturated, branched or linear alkyl group, having from 1 to 18 carbon atoms.

42. The material of claim 41 wherein the polymer is a latex.

43. The material of claim 38 wherein the polymer is a latex.

44. The material of claim 37 containing a cation with an aminomethyleneimine moiety.

45. The material of claim 44 wherein the polymer is a latex.

46. The material of claim 37 which also contains a non-woven fiber.

47. The material of claim 46 wherein the fiber is polybenzimidazole.

48. The material of claim 46 wherein the fiber is polybenzimidazole and fiberglass.

49. The material of claim 37 with a woven fiberous substrate.

50. The material of claim 37 which has been drawn into a film.

51. The material of claim 50 wherein the film has been hot-pressed.

52. The material of claim 37 which is a laminate.

53. The material of claim 37 wherein the polymer is a latex.

54. A water-resistant silicate and polymer material comprising a polymer having a molecular weight of at least 50,000 which is intermixed homogeneously in a flocculated, swelled 2:1 layered silicate having an average charge per structural unit that ranges from about $-0.4$ to about $-1$, wherein said silicate is selected from mica and vermiculite, and contains at least some interstitial cations with an aminomethyleneimine moiety.

55. A material as described in claim 54 which was prepared by contacting a co-dispersion of the polymer and a swelled 2:1 layered silicate which had interstitial cations that promote swelling, and was selected from mica and vermiculite, with a cationic flocculant having an aminomethyleneimine moiety to thereby destabilize the co-dispersion and form a silicate floc also containing the polymer.

* * * * *